US005685054A

United States Patent [19]

Yasnogorodskiy et al.

[11] Patent Number: 5,685,054

[45] Date of Patent: Nov. 11, 1997

[54] METHOD FOR INSTALLING FLEXIBLE SIGN PANELS WITH MOVABLE DEVICE

[75] Inventors: Vladimir Yasnogorodskiy, Oak Park; David U. Hillstrom, Novi, both of Mich.

[73] Assignee: Marketing Displays, Inc., Farmington Hills, Mich.

[21] Appl. No.: 251,592

[22] Filed: May 31, 1994

[51] Int. Cl.[6] .......... B23P 11/02

[52] U.S. Cl. .......... 29/446; 29/782; 40/603; 242/557

[58] Field of Search .......... 29/446, 448, 779, 29/782; 160/243; 40/514, 603, 604; 52/38; 242/557

[56] References Cited

U.S. PATENT DOCUMENTS 3,559,914 2/1971 Alderman .......... 242/557

5,163,634 11/1992 Moon et al. .......... 242/557 X 5,381,324 1/1995 Hillstrom et al. .......... 40/603 X

*Primary Examiner*—Blair Johnson

*Attorney, Agent, or Firm*—Brooks & Kushman

[57] ABSTRACT

An apparatus and method for stretching and installing a flexible face sign panel is disclosed. A frame-like trolley structure is provided which is positioned on a frame structure, preferably on a service station canopy fascia. A roll of sign panel material is positioned on a spindle which is held in place on the trolley frame structure by a pair of collar members. A roller member is provided to assist in applying the material onto the face of the frame structure. One of the collar members is adapted to firmly hold the spindle from rotating under certain conditions. A handle member is provided to allow rotation of the spindle and thus tightening and stretching of the flexible face sign panel. A plurality of clamping members are provided on the frame structure to lock the trolley in position as desired along the frame structure while a portion of the sign panel is being stretched and installed.

4 Claims, 5 Drawing Sheets

METHOD FOR INSTALLING FLEXIBLE SIGN PANELS WITH MOVABLE DEVICE

TECHNICAL FIELD

The present invention relates to a system for installing flexible sign panels and more particularly to a method and apparatus for installing flexible face sign panels on an illuminated canopy or fascia of a business establishment.

BACKGROUND OF THE INVENTION

Businesses with outdoor service areas, such as gasoline service stations, are improving the facilities and areas around them. These companies want to keep their places of business attractive to their customers, keep the appearances comparable to other businesses, and also make the facilities better illuminated and safer in non-daylight hours.

Service stations in particular today are improving the areas around the gasoline pumping areas by installing canopies over them that are well illuminated and provide an attractive appearance. A number of these canopies have signs, lights, or illuminated faces along the fascias.

An improved system for illuminating canopy fascias of this type is disclosed, for example, in U.S. patent application Ser. No. 996,103, U.S. Pat. No. 5,381,324, filed on Dec. 23, 1992 and entitled "Illuminated Canopy System." In that system, a decorative flexible sheet member is stretched across the face of each of the canopy fascias and held in place on an elongated frame structure. A plurality of lights, such as metal halide lights, are provided inside the fascias to distribute light on the face of the sign panel. Preferably, a light dispersion film is placed over the light sources in order to uniformly distribute the light. Also, trim caps and other housing members are provided to complete the external structure of the fascia "lightbox" device.

Other illuminated canopy systems feature use of fluorescent lamps to light the sign panels. The present invention can be used with these systems as well.

Installing the flexible sheet member on the face of the lightbox or other fascia structure can be a time consuming and difficult procedure. The canopy fascias are typically positioned approximately 15–25 feet above the ground, making them difficult to access. In addition, the flexible face sheets or panel members often are 20, 40 or even 100 or more feet in length and need to be applied as a single sheet for structural and aesthetic purposes. The sheet members also need to be installed under tension in all directions. Moreover, the flexible face sign panels are typically decorated with delicate materials which require special handling so that they will not be bent or creased which might affect the aesthetics or integrity of the final product.

Known methods for installing flexible face sign panels have included simple manual handling and stretching, applying the sign panels to the frame in the factory before it is sent to the site, as well as the use of a freely movable dolly. With the latter system, the flexible sign panel is rolled up from each end like a scroll. The installation of the sign panel proceeds from the center of the canopy fascia outwardly toward each end. Although the latter procedure works satisfactorily, it still is labor intensive, requires manual stretching and tensioning of the sign panel, and requires significant skill in aligning the pattern on the sign panel with the canopy fascia.

It is an object of the present invention to provide an improved method and apparatus for installing a flexible face sign panel on a canopy fascia structure. It is another object of the present invention to provide a system for stretching and tensioning the flexible face sign panel on a canopy fascia as it is being installed.

It is also an object of the present invention to provide an improved trolley and frame system for installing a flexible face sign panel, the trolley having improved ease of movement, improved installation and removal of rolls of the sheet material, and improved installation of the sheet material on the canopy fascia. It is a still further object of the present invention to provide an improved system for stretching and tensioning flexible face sign panels during installation which is more efficient, less costly and simpler and easier to use than known methods.

These and other objects, features, and advantages of the invention will become apparent from the following description of the invention and appended claims, when viewed in accordance with the attached drawings.

SUMMARY OF THE INVENTION

The present invention provides an improved apparatus and method for installing a flexible face sign panel on a canopy fascia structure. Once the frame structure for the lightbox housing is installed on the canopy fascia, together with the illumination system, a trolley structure is positioned on the frame structure and a roll of flexible face sign material is positioned on the trolley.

The trolley preferably comprises an aluminum frame structure with a plurality of wheels or other roller-type members which allow the trolley to travel along the frame structure, together with a plurality of clamping members to hold the trolley tightly in place where desired. A pair of collar members are provided on the trolley for holding the ends of the spindle on which the flexible face sign panel is rolled. Also, a roller member is secured at one side or the other of the trolley to position and guide the flexible face sign panel onto the frame structure.

The collar members are preferably provided with two sections hingedly mounted together for ease of installation and removal of the spindle. One of the collar members also is adapted to frictionally lock the spindle from rotation when desired. That collar member also has a restriction member for preventing complete opening of the collar member when the friction locking feature is released.

A lever-type handle member is provided which also is adapted to lock on one end of the spindle. The handle is used to manually rotate the spindle and thus the flexible face sign panel in order to stretch and tension it on the canopy fascia frame structure.

The trolley and roller member are adapted such that the roller member can be positioned on either side of the trolley and allow unrolling of the flexible face sign panel in either direction. This allows use of the trolley to install a sign panel starting from either end of the canopy frame structure.

For installation of the flexible face sign panel, the trolley is positioned on the frame structure after the frame structure is installed on the canopy fascia. Before positioning the trolley on the frame structure, a roll of flexible face sign panel material is positioned in the two collars on the trolley and secured in position. The end of the roll of sign material is secured to an end of the canopy fascia frame structure. Thereafter, the trolley is moved an appropriate distance along the frame structure unrolling the sign material behind it.

At this point, the trolley is clamped in position on the frame structure by the plurality of clamping members. The handle is then used to stretch and tension the sign panel along the face of the canopy frame structure. Rotation of the spindle is then locked in position by the locking collar member. At this point the upper and lower edges of the sign panel are tensioned and secured in position from the starting end of the frame structure to a position adjacent the roller member.

Once the above sequence of steps is completed, the locking clamps on the trolley are released, the trolley is moved along the frame structure to another location, and the process is repeated for stretching and securing another section of the sign panel to the frame structure. The same process and procedure is repeated along the length of the canopy fascia until the trolley reaches the opposite end. At this point, the remainder of the sign material is removed from the spindle and the trolley is removed from the frame structure. The final portion of the sign material is then stretched and positioned on the frame structure by hand, thereby completing the installation.

BEST MODE(S) FOR CARRYING OUT THE INVENTION

FIGS. 1–11 illustrate the features and advantages of the present invention. The present invention is particularly suitable for use in installing flexible face sign panels on canopy fascias at gasoline service stations. However, it is understood that the present invention can be used to install sheet members on any structure where desired.

Figure 1:
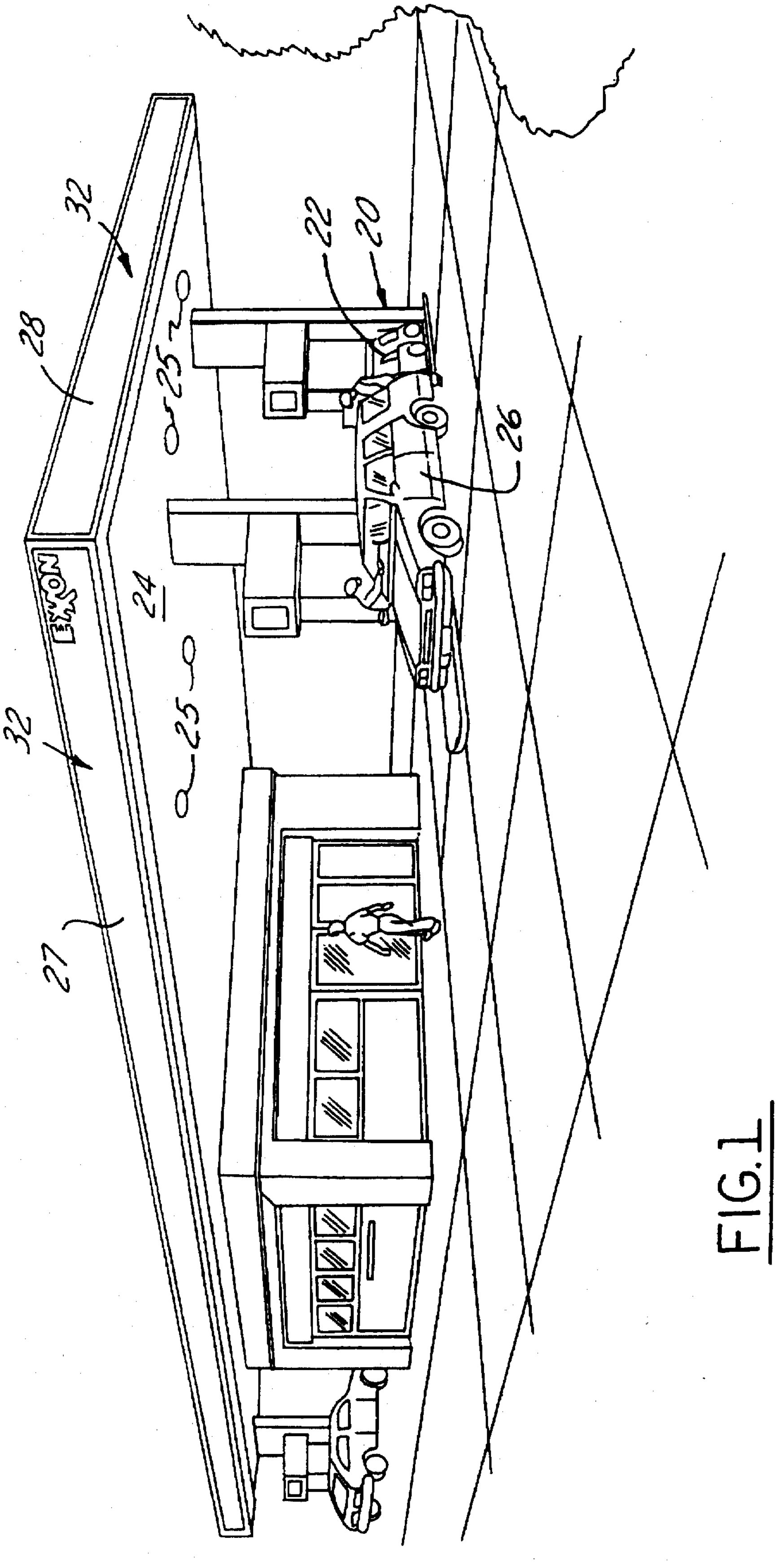
FIG. 1 illustrates an illuminated canopy and fascia system for a service station.
Figure 2:
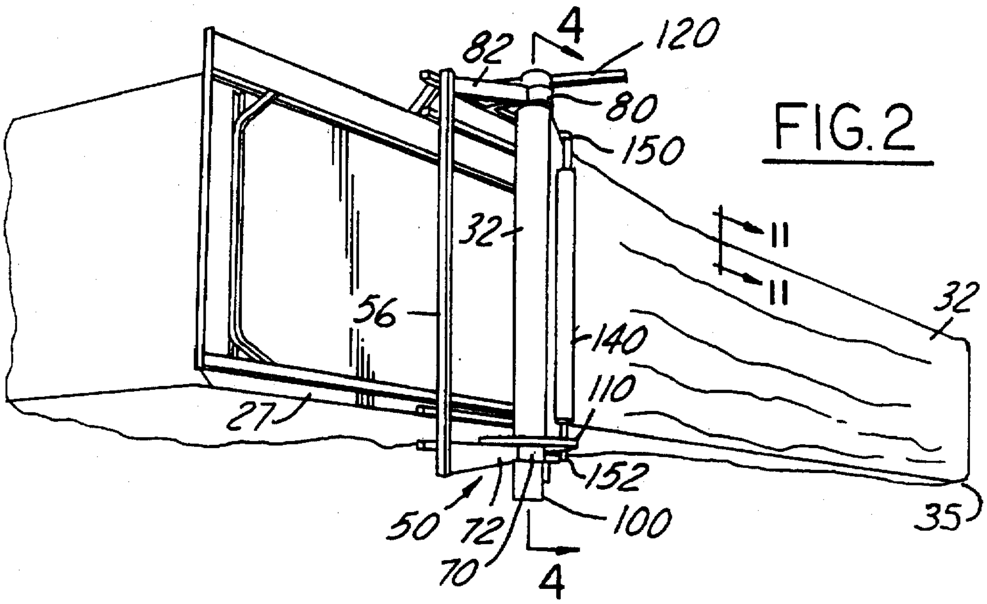
FIG. 2 is a perspective view of a canopy fascia structure of the type shown in FIG. 1 and illustrating the use of the present invention.
Figure 4:
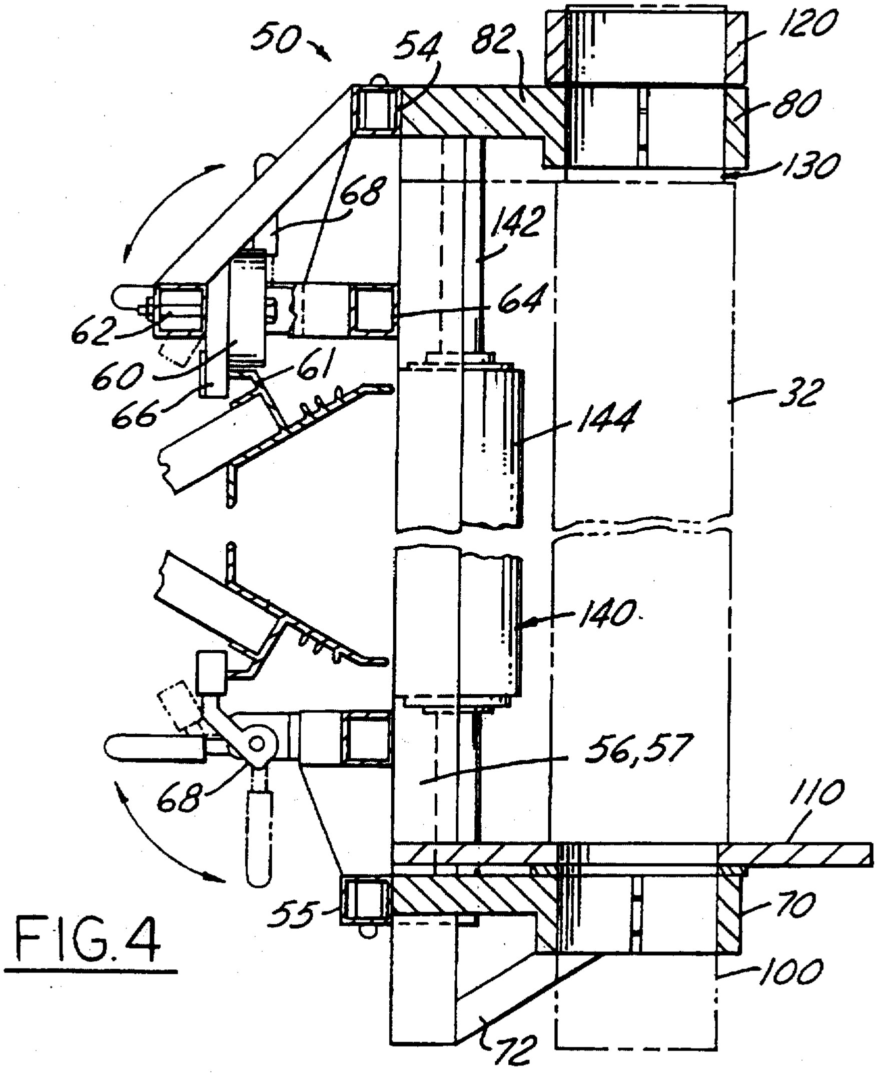
FIG. 4 is a cross-sectional view of the trolley as shown in FIG. 2 and as taken along lines 4—4 in FIG. 2.
Figure 3:
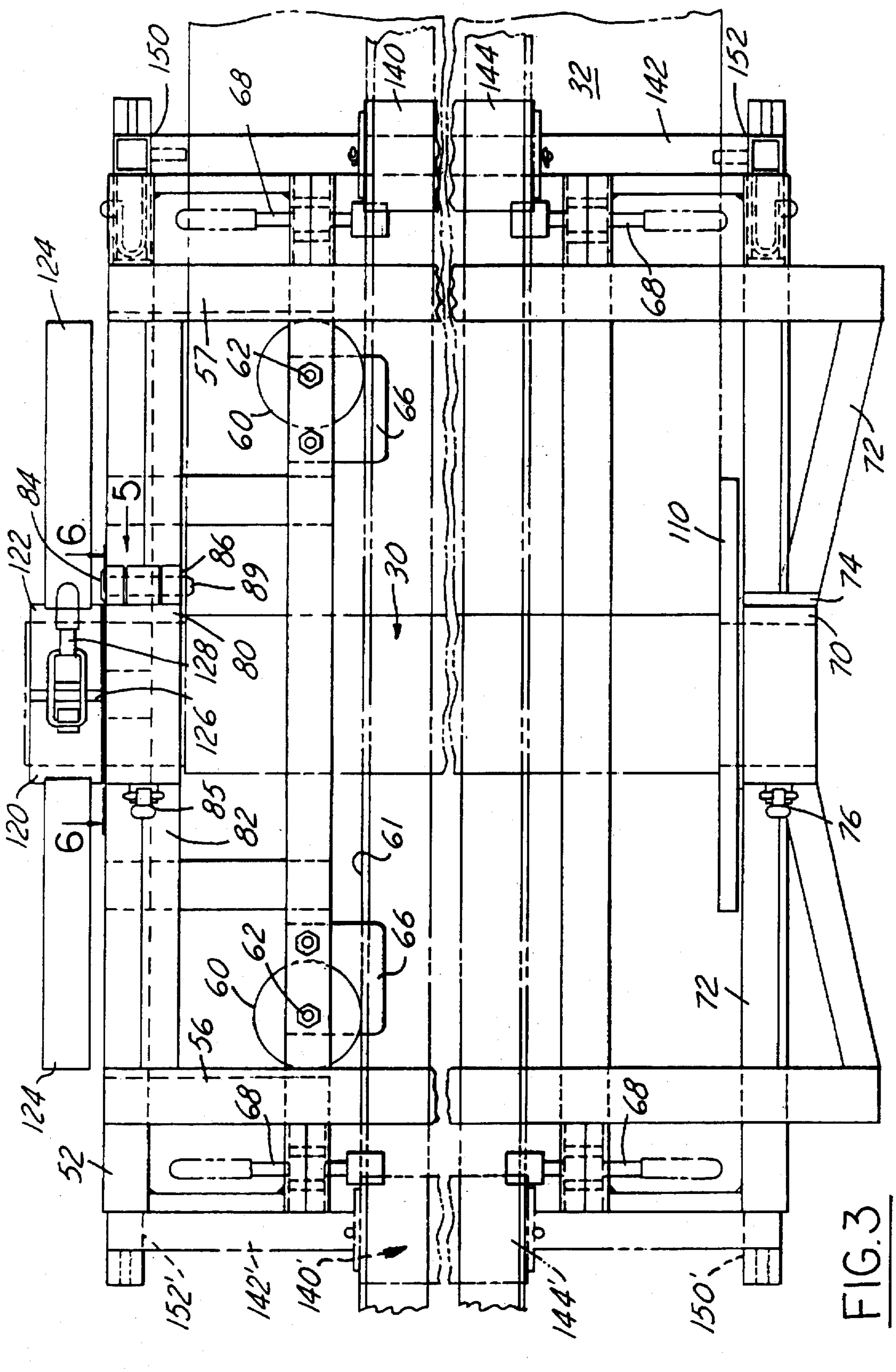
FIG. 3 is a front elevational view of the preferred trolley and roller member in accordance with the present invention.
Figure 5:
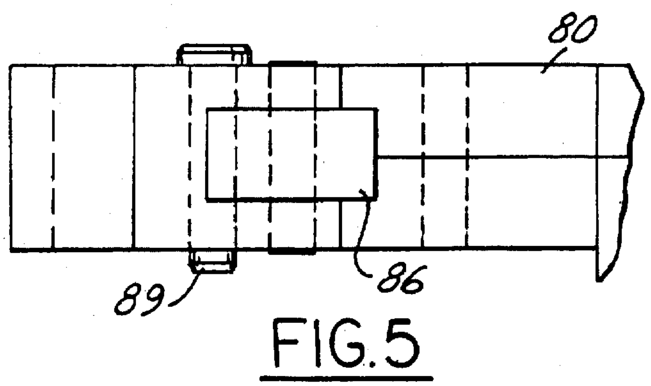
FIGS. 5–8 depict a collar member used with the present invention.
Figure 6:
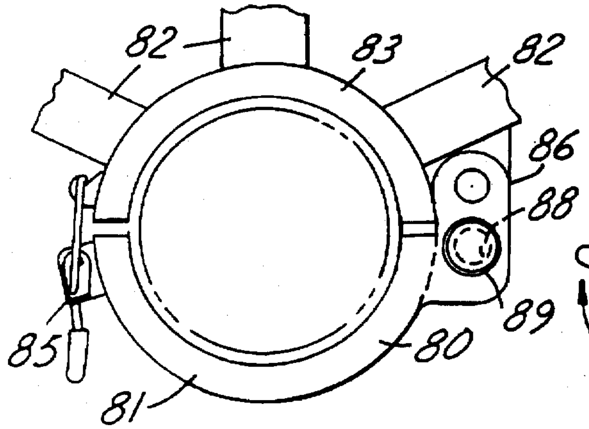
Figure 7:
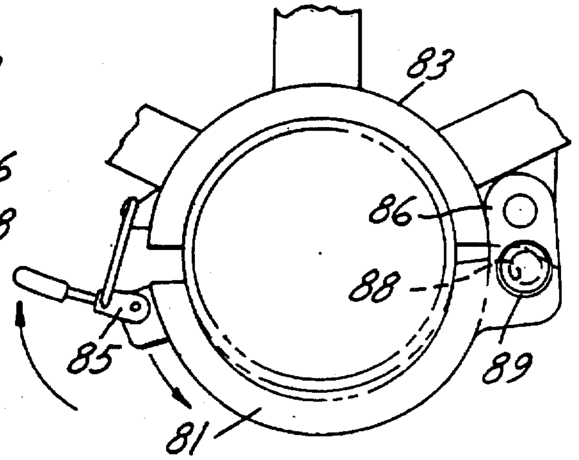
Figure 8:
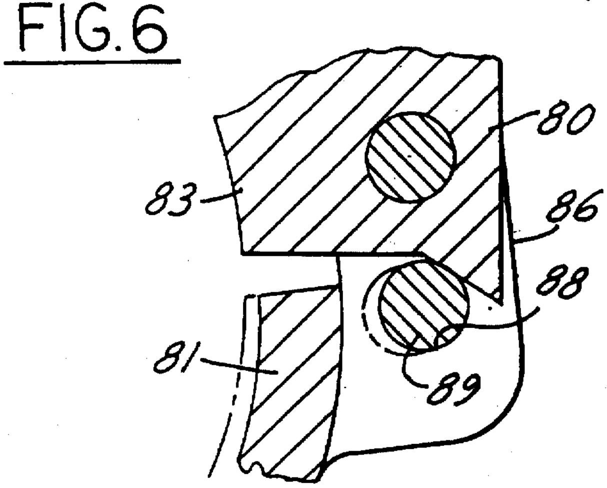
Figure 9:
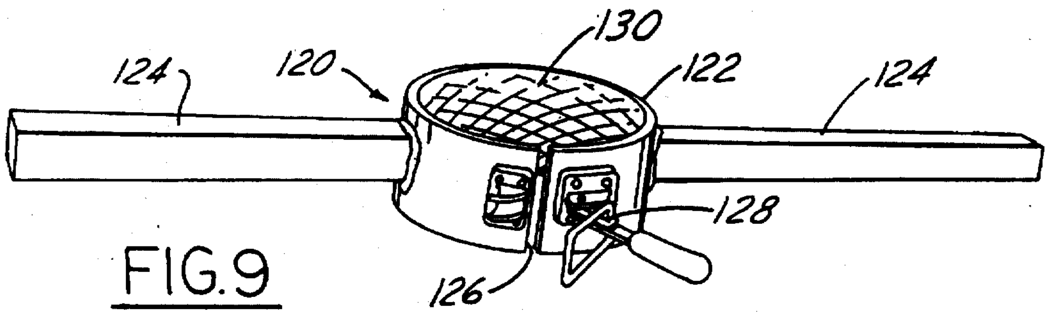
FIG. 9 discloses a handle member utilizable with the present invention.
Figure 10:
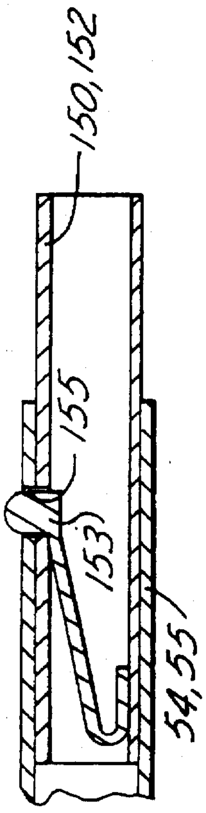
FIG. 10 illustrates a mechanism for securing the roller member to the trolley in accordance with the present invention.
Figure 11:
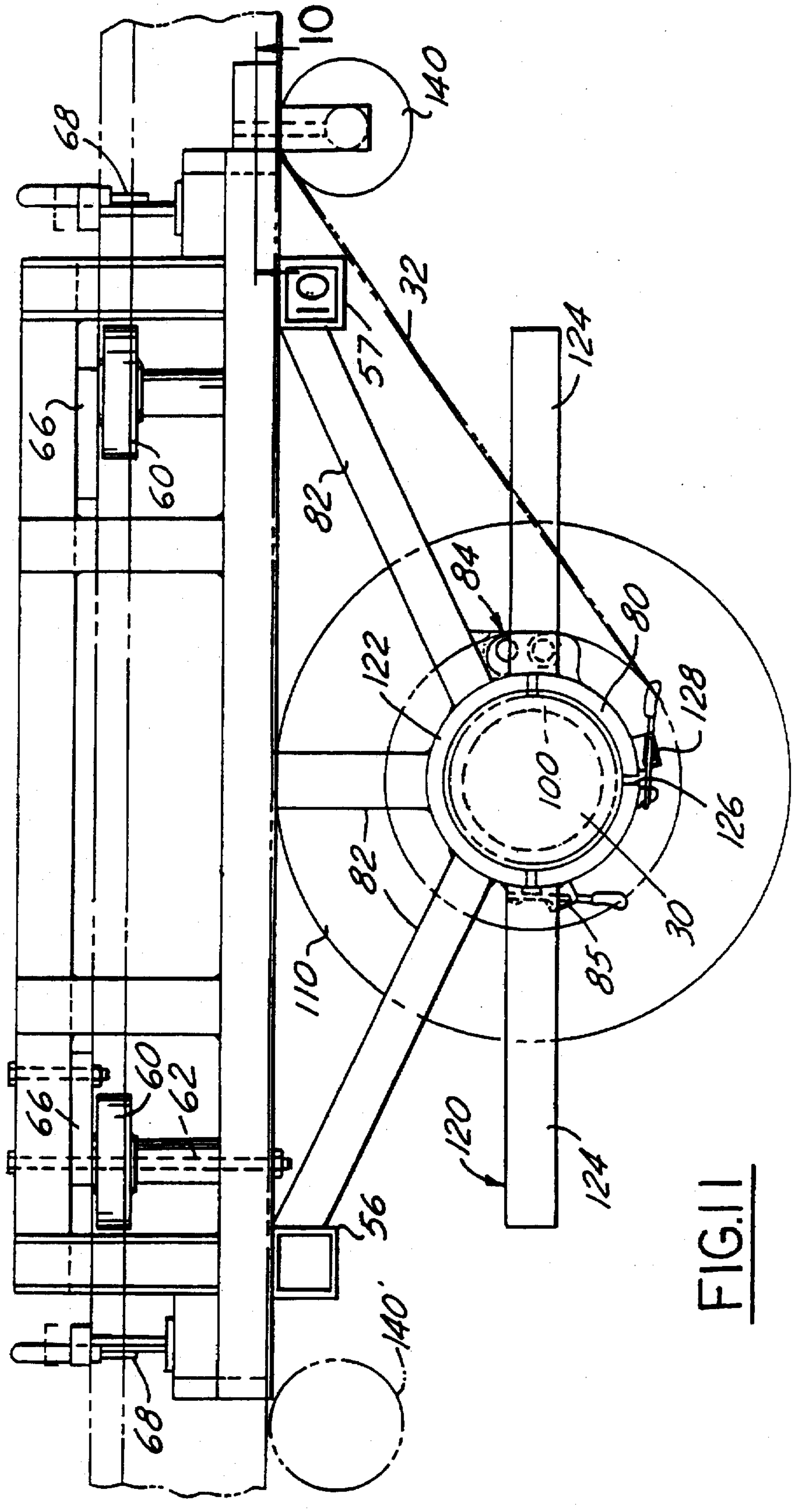
FIG. 11 is a top elevational view of the invention.

As shown in FIG. 1, the service station has an island 20 with a number of gasoline pumps 22 positioned thereon and the entire area is covered with a canopy 24. The canopy covers the area where the vehicles 26 are parked to purchase gasoline, protects the customers from weather elements and also provides a safe, well illuminated area for use at night.

Typically, a number of lights 25 (not shown) are provided on the underside of the canopy which project illumination downwardly for the customers benefit. Also, the canopy has fascia areas around its perimeter which typically are approximately 1–3 feet in height and can be 10–20 to 100 feet or more in width. These fascia areas are indicated by the numerals 27 and 28 in FIG. 1. These fascia areas can be illuminated, although normally only those fascia areas which are exposed to passing motorists and are visible from a distance are typically illuminated. The illumination allows the name of the service station to be highlighted and also provides reference to some of the services and facilities of the station. Typically, at least two and in most cases three fascia areas of the canopies are illuminated.

The canopies can be illuminated in a number of ways. For example, there are a number of conventional systems in use today which illuminate canopies internally by a plurality of elongated fluorescent lights. An improved illumination system, and the one preferably used with the present invention, utilizes a plurality of single point lights, such as metal halide lights and a light dispersion film member positioned between the lights and the front panel of the fascia structure. The fascia structure has an extruded aluminum frame system around its perimeter and a flexible face sign panel tensioned and held in place on its outer surface. An illumination system of this type is shown in U.S. patent application Ser. No. 996,103, filed on Dec. 23, 1992, entitled “Illuminated Canopy System” and assigned to the same entity as the present invention. The disclosure of U.S. patent application Ser. No. 996,103 is hereby incorporated herein by reference.

The trolley member in accordance with the present invention is generally designated by the numeral 50 in the drawings. The trolley has a generally frame-like structure made from a plurality of square aluminum tubing. Aluminum is provided for its lightness and durability, although other materials with similar qualities and features could be used.

The trolley member 50 has a generally rectangular frame structure 52 consisting of horizontal members 54 and 55 and vertical members 56 and 57. The tubing for the frame structure as well as the other members of the trolley are all preferably welded together, although other conventional fastening means could be used.

A pair of wheels or rollers 60 are provided on the upper end of the frame structure. The wheels 60 are positioned to travel along one of the upper rails or flanges 61 of the frame structure on the canopy fascia. Wheels 60 are mounted on axles or spindles 62 and secured by an adjacent frame structure 64 which is welded or otherwise secured to the frame structure 52.

A pair of guide blocks 66 are provided to help retain the trolley 50 on the canopy frame structure. The glide blocks are preferably made from a plastic material, such as a high molecular weight polyurethane. The glide blocks also, since they are made of plastic, provide a gliding surface which is low in friction and allows the trolley to be moved easily along the frame structure.

A plurality of clamping members 68 or clamp locks are attached to the rear of the frame structure 52. These clamping members are preferably “Destaco-type” toggle clamp locks and are used to lock the trolley in position on the frame structure.

A lower collar member 70 is attached to the frame structure by a plurality of support members 72. Collar member 70 is formed in two half or semicircular sections hingedly joined together at one end by hinge member 74. A clamping member 76 is used to hold the two halves of the lower collar member 70 together when the collar is in its closed position.

A second collar member 80 is attached to the upper end of the frame structure 52. Collar member 80 is similar to lower collar member 70 in the sense that it is attached by a plurality of support members 82 to the frame structure and is provided in two halves 81,83 or semicircles hingedly connected together at one end by hinge member 86 and adapted to be securely locked together at the opposite side by a toggle-like clamp member 85. The upper collar member 80, however, has a hinge member with a secondary locking mechanism 84 to prevent undesired opening of the two halves of the collar except for entry and removal of the sheet material roll 30. In the pivot or hinged member 86, an opening 88 is provided for a hitch pin 89 or the like. When the collar halves are in their closed position and the hitch pin 89 is inserted in the opening, the collar 80 can only open a limited extent, such as ⅛–¼ of an inch, when the toggle-clamp 85 is released. On the other hand, when the hitch pin is removed, the two halves of the collar member can be rotated to the completely open position.

The two collar members 70 and 80 are provided to hold a roll 30 of flexible face sign panel 32 in place on the trolley. The flexible face sign panel normally is supplied on a cardboard or other type of conventional spindle 100. When the collar members 70 and 80 are rotated to their open positions, the spindle 100 of the flexible face sign panel roll can be installed and removed in the collars. On the other hand, once the spindle 100 is positioned in the collars 70,80 and the collars are rotated to their closed and locked positions, encircling the ends of the spindle, the spindle and flexible sheet sign panel roll cannot be removed from the trolley. The upper collar 80 also is adapted to selectively lock the spindle and prevent it from rotating.

In order to support the sheet material on the roll when it is installed in the trolley, an enlarged circular disk 110 is positioned over the end of the spindle before it is positioned in the lower collar member 70. Preferably, the disk is of a ultra high molecular weight plastic material, although it could be made of any other material with an appropriate washer or the like provided with it.

A handle member 120 is provided to assist in tensioning and stretching the flexible sheet sign panel 32 after it is rolled out a sufficient distance on the frame structure. The handle has a central collar 122 and a pair of elongated lever-type handle members 124. The collar 122 has an aperture or opening 126 thereon so that the size of the collar opening can be adjusted slightly as desired. A toggle-type clamping member 128 is provided to close and lock the opening or aperture 126 as desired.

The handle 120 is adapted to be positioned over the upper end of the spindle 100 and, when clamped thereon, used to rotate the spindle. For this purpose, a series of grooves 130 are preferably provided on the interior surface of the collar 122 to increase the friction (see FIG. 9).

Although it is preferred that the handle 120 be positioned on the upper end of the spindle 100, it is also understood that the handle could be positioned on the lower end of the spindle and used to stretch and tension the flexible face sign material 32 in the same manner.

Roller member 140 is attached to the trolley member 52. The roller member 140 includes an elongated shaft 142 and a rotatable cylindrically-shaped roller 144 mounted thereon. Preferably the roller 144 is made from a plastic or comparable material. A pair of cotter pins positioned in openings on the shaft 142 hold the roller 144 in position.

The two ends 150 and 152 of the roller member 140 are adapted to be positioned in the open ends of the tubing members comprising the trolley frame structure 52. In this regard, the ends 150 and 152 have a mating tubular member which telescopically fits inside the tubing members 54 and 55 of the frame structure (see FIG. 10). A spring-activated detent button 153 is provided on the ends 150,152 of the roller member and are adapted to mate with openings 155 in the frame tubing 54,55 so that the roller member can be firmly locked in position on the trolley.

The invention is adapted such that the roller member 140 can be positioned on either side of the frame structure 52 of the trolley 50. As shown in phantom lines 140' in FIGS. 3 and 11, the roller member 140 can be removed from one side of the frame structure and positioned on the opposite side. In this regard, the roller member has to be rotated 180°, as shown by the position of ends 150' and 152' in FIG. 3, in order to be positioned on the other side.

As shown in the drawings, roller member 140 is positioned such that it rides along the outer edges or surface of the frame structure thus ensuring that the sign panel 32 is positioned against the front face of the frame structure when it is being applied thereto.

In use, after the roll of sign material 32 is positioned in the collars 70 and 80 in the trolley, one end of the material is threaded between the roller member 140 and the frame structure as shown. The end of the sheet material is then secured to one end 35 of the frame structure in any conventional manner.

In use, the trolley is positioned on the frame structure after the frame structure is installed on the canopy fascia. The trolley can be positioned on the frame structure either by hand or with a crane of some type. Prior to positioning the trolley on the frame structure, a roll of flexible face sign material is positioned and locked in the collars 70 and 80. It is also possible in accordance with the present invention to position the roll of sign material in the trolley after the trolley is positioned on the frame structure. The end of the sheet material is then passed under the roller member 140 and secured to the end of the frame structure.

The trolley member is transported a distance along the frame structure as desired by the installers. Typically, this can be anywhere from 6–10 feet. As the trolley is being moved along the frame structure, the spindle is allowed to turn in the collar member 70 and 80 thus allowing the sheet material to be unrolled. Thereafter, the clamping members 68 positioned on the rear of the frame structure are manually activated to firmly hold the trolley in position on the frame structure. Once the trolley is locked in position, the handle is rotated thereby stretching and tensioning the sign material along the face of the frame structure. Once the appropriate tension is reached, the upper collar member 80 is firmly locked in position, preventing the spindle and sheet material from moving in either direction.

At this point, the upper and lower edges of the flexible face sheet material are stretched and clamped in position on the upper and lower edges of the frame structure as known in the art, or as disclosed in application Ser. No. 996,103, the disclosure of which is hereby incorporated by reference.

Once the upper and lower edges of the flexible face sheet material are secured to the frame structure, the clamping members are released from the frame structure, the upper collar 80 is loosened, and the trolley is then moved to still another position along the frame structure. At this point, the process mentioned above is repeated and a second portion of the sheet material is tightly tensioned and secured in position on the frame structure.

This process is repeated along the length of the frame structure until the trolley is positioned at or near the opposite end of the frame structure from where it started. Once the flexible face sign material is stretched and secured as far along the frame structure as possible, the final few feet of the sign material is unrolled from the spindle, and the trolley 50 is removed from the frame. In this regard, the trolley and roller members are removed either by hand or crane as desired.

Once the trolley member is removed, the remaining few feet of the sign panel is stretched and affixed to the opposite end. The upper and lower edges of the sign panel are secured as well.

As is clear from the above description of the apparatus and method for installing the flexible face sign panel, the present invention provides an improved system for installing and stretching a flexible face sign panel on a frame structure.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method for installing flexible face sign panels on a frame structure, said method comprising the steps of:

a) positioning a roll of sign panel material in a trolley member, said trolley member having a plurality of roller members;

b) positioning said trolley member on said frame structure, said roller members being positioned on a portion of said frame members to allow said trolley member to move along said frame member on said roller members;

c) securing one end of said sign panel material to said frame structure;

d) moving said trolley member on said roller members to a first position along said frame structure;

e) releasably securing said trolley member to said frame structure;

f) stretching said sign panel material along said frame structure by at least tightening said roll of sign panel material on said trolley member; and g) securing said stretched sign panel material to said frame structure.

2. The method of claim 1 further comprising the steps of:

h) releasing said trolley member;

i) moving said trolley member to a second position on said frame structure; and j) repeating steps e), f) and g).

3. The method of claim 1 wherein said roller members comprise wheel members.

4. The method of claim 1 wherein said step of securing said stretched sign panel material to said frame structure comprises securing the upper and lower edges of said sign panel material to said frame structure.

* * * * *

UNITED STATES PATENT AND TRADEMARK OFFICE

CERTIFICATE OF CORRECTION

PATENT NO. : 5,685,054
DATED : November 11, 1997
INVENTOR(S) : Vladimir Yasnogorodskiy et al It is certified that error appears in the above-identified patent and that said Letters Patent is hereby corrected as shown below:

Col. 5, Line 14 "roll 30" should be --roll 36--

Col. 6, Line 7 "shown by the position" should be --shown by respective position--

Signed and Sealed this

Twenty-second Day of June, 1999

Attest:

Q. TODD DICKINSON

Attesting Officer

*Acting Commissioner of Patents and Trademarks*